US012800348B2

(12) United States Patent
Kato et al.

(10) Patent No.: US 12,800,348 B2
(45) Date of Patent: Nov. 17, 2026

(54) ROTARY POSITION SENSOR

(71) Applicant: Alps Alpine Co., Ltd., Tokyo (JP)

(72) Inventors: Hidekazu Kato, Miyagi-ken (JP); Jyunichi Kato, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 147 days.

(21) Appl. No.: 18/939,871

(22) Filed: Nov. 7, 2024

(65) Prior Publication Data

US 2025/0060229 A1 Feb. 20, 2025

Related U.S. Application Data

(63) Continuation of application No. PCT/JP2023/005814, filed on Feb. 17, 2023.

(30) Foreign Application Priority Data

Jun. 1, 2022 (JP) ................................ 2022-089596

(51) Int. Cl.
*G01D 5/16* (2006.01)
*G01B 7/30* (2006.01)
*G01L 5/12* (2006.01)

(52) U.S. Cl.
CPC ................ *G01D 5/16* (2013.01); *G01B 7/30* (2013.01)

(58) Field of Classification Search
CPC ............ G01B 7/30; G01B 11/026; G01L 5/12
See application file for complete search history.

(56) References Cited

U.S. PATENT DOCUMENTS

| | | | | |
|---|---|---|---|---|
| 6,912,791 | B2 * | 7/2005 | Tateishi | G01D 11/245 33/534 |
| 9,789,624 | B2 * | 10/2017 | Kimura | B23D 45/042 |
| 2004/0103733 | A1 * | 6/2004 | Sumita | H02K 11/21 74/421 A |
| 2010/0170355 | A1 * | 7/2010 | Kume | F16H 61/32 29/428 |
| 2016/0195442 | A1 * | 7/2016 | Saito | G01L 3/109 73/862.325 |
| 2017/0023442 | A1 * | 1/2017 | Braghiroli | G01M 17/021 |

FOREIGN PATENT DOCUMENTS

| | | |
|---|---|---|
| JP | 2019-197762 | 11/2019 |
| JP | 2020-188146 | 11/2020 |

OTHER PUBLICATIONS

International Search Report from International Application No. PCT/JP2023/005814 dated Apr. 25, 2023, with English translation.

* cited by examiner

*Primary Examiner* — Raul J Rios Russo
*Assistant Examiner* — Temilade S Rhodes-Vivour
(74) *Attorney, Agent, or Firm* — Beyer Law Group LLP

(57) ABSTRACT

A rotary position sensor configured to transmit the rotational motion from the outside to a rotating body with high accuracy, allowing inspection without affecting the shaft hole includes a rotating body including a cylindrical shaft body having a shaft hole and a flange continuously connected to the shaft body and extending outward in a radial direction of the shaft body, a housing including a bearing through which the shaft body of the rotating body is inserted, and a measuring unit configured to measure a relative position of the rotating body to the housing, wherein the flange includes an engaging portion on a periphery thereof.

15 Claims, 32 Drawing Sheets

ROTARY POSITION SENSOR

CLAIM OF PRIORITY

This application is a Continuation of International Application No. PCT/JP2023/005814 filed on Feb. 17, 2023, which claims benefit of Japanese Patent Application No. 2022-089596 filed on Jun. 1, 2022. The entire contents of each application noted above are hereby incorporated by reference.

BACKGROUND OF THE INVENTION

1. Field of the Invention

The present invention relates to a rotary position sensor that measures the relative position of a rotating body to the housing.

2. Description of the Related Art

As a rotary position sensor that detects the rotational motion of a rotating body, Japanese Patent Application Publication No. 2019-197762 discloses an electronic component capable of suppressing poor connections between the substrate and terminals. The electronic component includes a substrate, terminals electrically and mechanically connected to the substrate, a case that houses the substrate, and a holding structure for holding the terminals in the case.

Japanese Patent Application Publication No. 2020-188146 discloses a rotary electronic component in which the rotational angle position of the rotary member and the output value corresponding to that position are nearly proportional, allowing for increased precision. The rotary electronic component includes a rotary member rotatable about the axis, a holding member that rotatably holds the rotary member, multiple terminals fixed to the holding member, and a mechanical section that changes the electrical state between the multiple terminals according to the rotational angle position of the rotary member. The rotary member includes a first rotating body and a second rotating body positioned relative to the first rotating body and including a bearing or a shaft.

In performing inspections using a rotary position sensor, the rotating body is rotated at a predetermined angle using a predetermined operating jig, and it is determined whether a measured value corresponding to the rotational angle falls within a prescribed range. For this reason, it is necessary to transmit the rotational motion from the operating jig to the rotating body with high accuracy. Inserting an operating jig into the shaft hole of the rotating body to transmit rotational force to the rotating body may affect the shaft hole.

SUMMARY OF THE INVENTION

The present invention has been made in view of such actual situation and provides a rotary position sensor in which the rotational motion can be transmitted from the outside to the rotating body with high accuracy, allowing for inspection without affecting the shaft hole.

A rotary position sensor according to an aspect of the present invention includes: a rotating body including a cylindrical shaft body having a shaft hole and a flange continuously connected to the shaft body and extending outward in a radial direction of the shaft body; a housing including a bearing through which the shaft body of the rotating body is inserted; and a measuring unit configured to measure a relative position of the rotating body to the housing, wherein the flange includes an engaging portion on a periphery thereof.

With this configuration, the rotating body can be rotated by applying an external force to the engaging portion located on the periphery of the rotating body, improving the operation accuracy of the rotating body compared with a case in which the force is applied to the vicinity of the central axis of the rotating body. This configuration allows for the measurement without touching the shaft hole, preventing an impact on the shaft hole during inspection.

In the rotary position sensor, the shaft hole may have a holder for receiving and holding an operating shaft having a non-circular cross section, as viewed in a direction along an axis of rotation of the rotating body. This configuration allows for functional inspection of the measuring unit without inserting a member for use in the inspection into the shaft hole. This allows for inspection without affecting the holder that receives and holds the operating shaft.

In The rotary position sensor, the engaging portion may include a first engaging portion and a second engaging portion arranged with an axis of rotation of the rotating body sandwiched therebetween, wherein the first engaging portion and the second engaging portion are line-symmetry about a first imaginary line extending along the radial direction of the rotating body, as viewed in a direction along the axis of rotation of the rotating body. For this reason, for a configuration in which a member that applies force to the rotating body is brought into contact with the two engaging portions to operate the rotating body, the line-symmetrical shape of the two engaging portions allows the member to be brought into symmetric-contact with the rotating body, thereby improving the operability of the member.

In the rotary position sensor, the engaging portion may include an extending portion extending outward in the radial direction of the rotating body, as viewed in a direction extending along an axis of rotation of the rotating body. With this configuration, the internal space of the rotating body is larger than a configuration in which the engaging portions are recessed inside the rotating body, providing greater flexibility in the arrangement of the measuring unit.

In the rotary position sensor, the extending portion may include a protruding portion protruding in a direction perpendicular to a direction in which the extending portion extends, as viewed in the direction along the axis of rotation of the rotating body. The protruding portion is easy for the member to come into contact therewith than the other portions, enhancing the attachment performance of the member that applies force to the rotating body.

In the rotary position sensor, the protruding portion may be formed as a curve, as viewed in the direction along the axis of rotation of the rotating body. This configuration enhances the contact stability between the member that applies force to the rotating body and the engaging portions.

In the rotary position sensor, the flange may include a partially recessed portion continuously connected to the extending portion, as viewed in the direction along the axis of rotation of the rotating body. The presence of the recessed portion may make it easier to bring the member that applies force to the rotating body into contact with the engaging portion. The presence of the extending portion continuously connected to the recessed portion ensures stable contact between the member that applies force to the rotating body and the engaging portion even if the degree of extension of the extending portion is low, allowing for reducing the size of the sensor.

In the rotary position sensor, the engaging portion may have a line-symmetric shape, with a second imaginary line extending along a radial direction of the rotating body and passing through the engaging portion as an axis of symmetry, as viewed in a direction along an axis of rotation of the rotating body. For a configuration in which the member that applies force to the rotating body engages with one engaging portion to operate the rotating body, the line-symmetry shape of the engaging portion may improve the operability of the member.

In the rotary position sensor, the housing may include a protrusion having an overlapping portion overlapping with the engaging portion of the rotating body positioned at a reference position, as viewed in a direction along an axis of rotation of the rotating body. Disposing an alignment member so as to come into contact with the overlapping portion of the protrusion and the engaging portion allows the rotating body to be positioned at the reference position.

In the rotary position sensor, the protrusion may include a portion positioned outside the engaging portion, as viewed in the direction along the axis of rotation of the rotating body. If the protrusion includes a portion positioned outside the engaging portion, it can easily be visually determined whether the rotating body is at the reference position in the direction along the axis of rotation.

In the rotary position sensor, the measuring unit may include a fixed measuring unit mounted on the housing and a movable measuring unit mounted on the rotating body. This configuration allows the movable measuring unit to rotate relative to the fixed measuring unit of the housing by rotating the rotating body, thereby measuring changes of the relative position between the rotating body and the housing.

In the rotary position sensor, the fixed measuring unit may include a resistor, and the movable measuring unit may include a sliding element that comes into sliding-contact with the resistor. With this configuration, the resistance changes based on the sliding-contact position between the resistor of the fixed measuring unit and the sliding element of the movable measuring unit, allowing the relative position between the rotating body and the housing to be measured.

In the rotary position sensor, the movable measuring unit may include a resistor, and the fixed measuring unit may include a sliding element that comes into sliding-contact with the resistor. With this configuration, the resistance changes based on the sliding-contact position between the resistor of the movable measuring unit and the sliding element of the fixed measuring unit, allowing the relative position between the rotating body and the housing to be measured.

The rotary position sensor may further include a crush rib provided on an inner wall of the shaft hole. With this configuration, even for the rotating body with the shaft hole equipped with the crush rib, the member that applies force to the rotating body and the engaging portion are engaged using the engaging portion without affecting the crush rib.

In the rotary position sensor, the engaging portion may engage with an operating jig of a functional inspection apparatus for the measuring unit. This configuration enhances the operation accuracy of the operating jig by engaging the operating jig at the engaging portion located on the periphery of the rotating body. This configuration allows for measurement without touching the shaft hole, preventing an impact on the shaft hole during inspection.

DESCRIPTION OF THE PREFERRED EMBODIMENTS

Embodiments of the present invention will be described hereinbelow with reference to the accompanying drawings. In the following description, like components are given like reference signs, and the description of components that have been described once will be omitted as appropriate.

Configuration of Rotary Position Sensor

Figure 1:
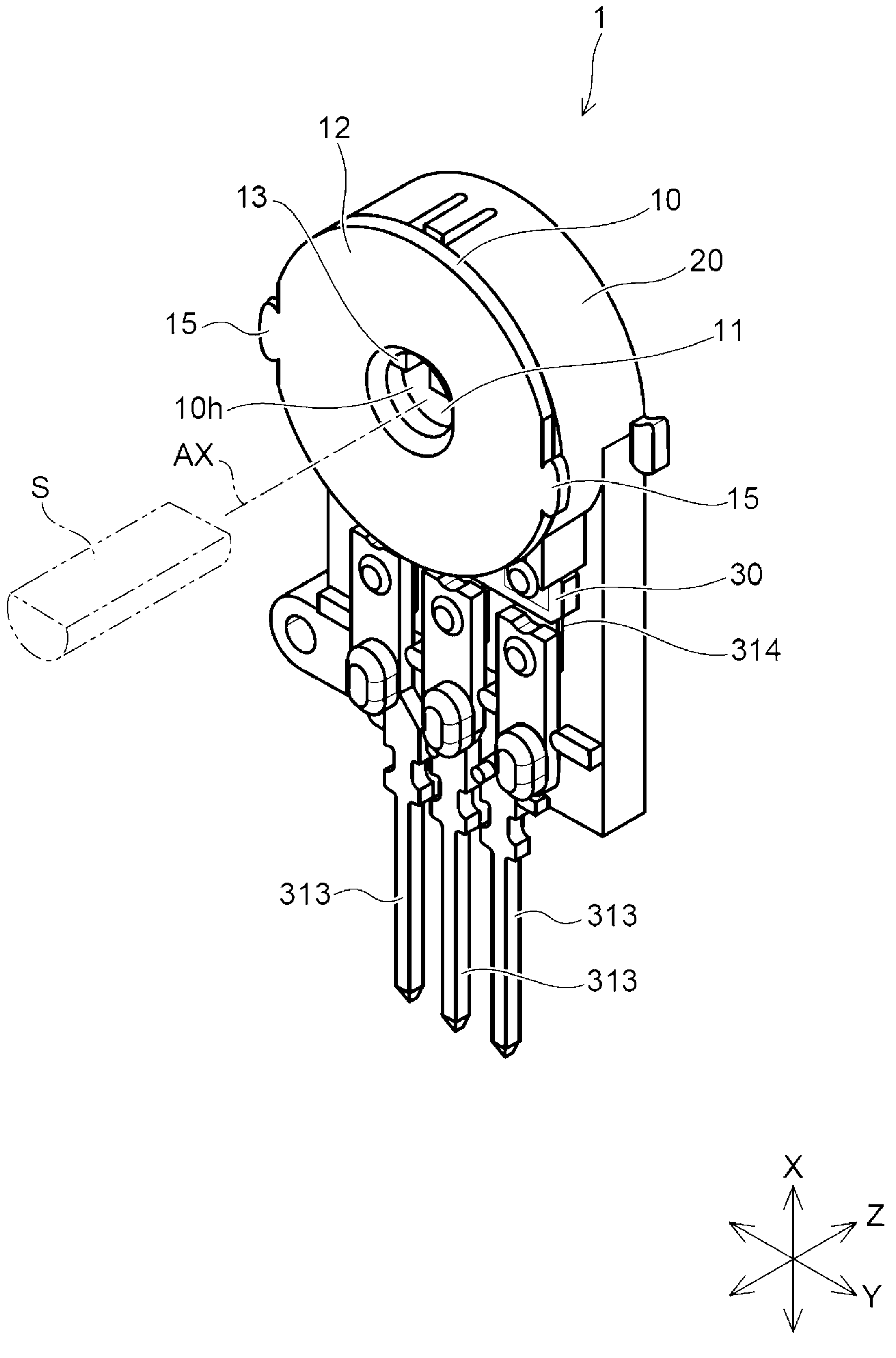
FIG. 1 is a perspective view of a rotary position sensor according to one embodiment.
Figure 2:
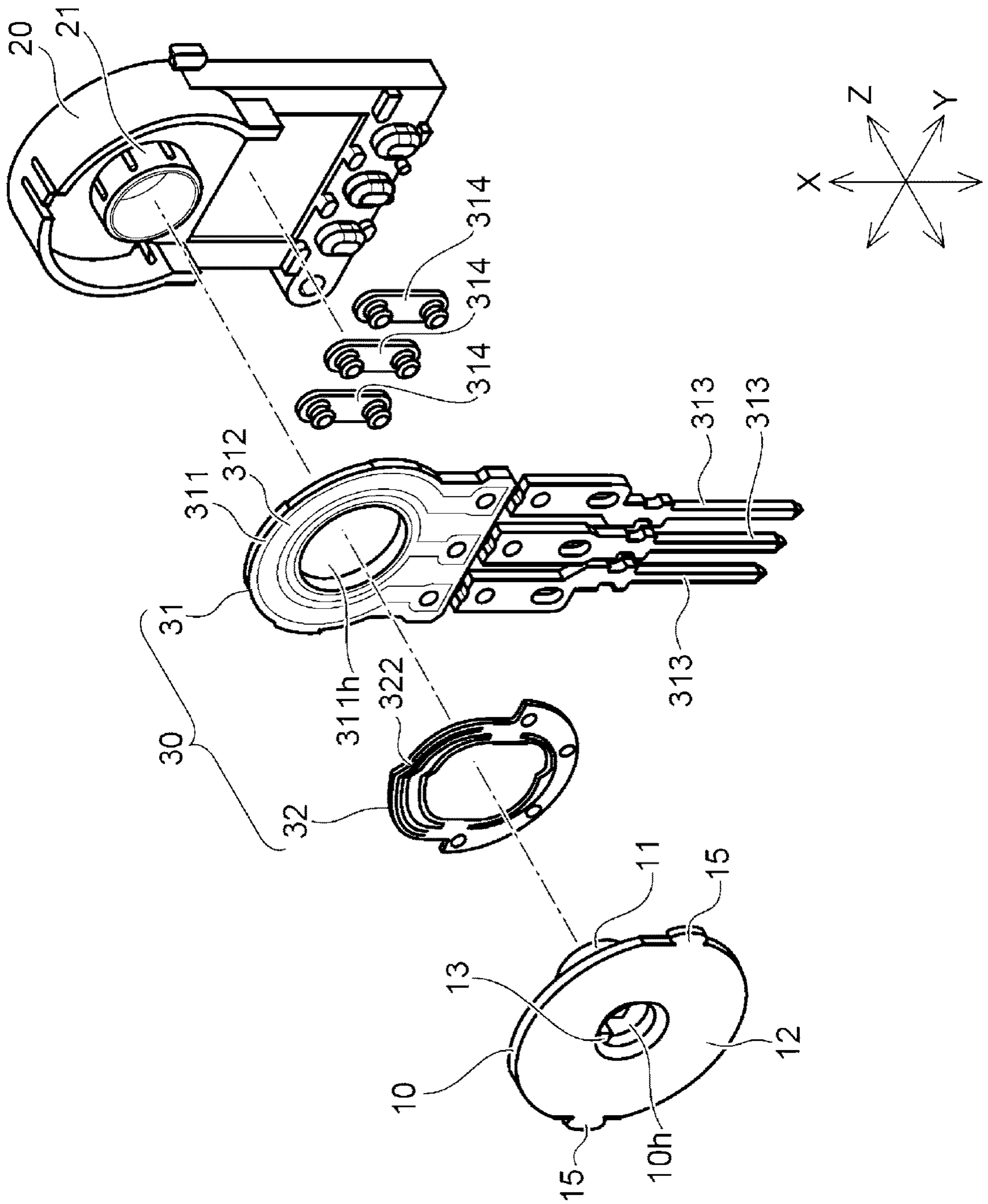
FIG. 2 is an exploded perspective view of the rotary position sensor according to the embodiment illustrating the configuration thereof.

FIG. 1 is a perspective view of a rotary position sensor according to one embodiment. FIG. 2 is an exploded perspective view of the rotary position sensor according to the embodiment. The rotary position sensor 1 according to this embodiment is an apparatus that includes a rotating body 10, a housing 20, and a measuring unit 30 and measures the relative position of the rotating body 10 to the housing 20 using the measuring unit 30.

The rotating body 10 includes a cylindrical shaft body 11 having a shaft hole 10*h* and a flange 12 continuously connected to the shaft body 11 and extending radially outward. In this embodiment, one of the radial directions of the rotating body 10 is also referred to as the X-direction, another radial direction perpendicular to the X-direction is also referred to as the Y-direction, and the direction along the axis of rotation, AX, of the rotating body 10 (the axial direction of the shaft hole 10*h*) is also referred to as the Z-direction.

The shaft hole 10*h* of the shaft body 11 is provided with a holder 13 that receives an operating shaft S having a non-circular cross section, as viewed in the Z-direction. Examples of the cross section of the operating shaft S as viewed in the Z-direction include approximately a D-shape and approximately a D-shape with a protrusion (serving as the key). The holder 13 transmits the rotational operation of the operating shaft S to the rotating body 10 by receiving the operating shaft S with such a cross section.

The housing 20 serves as the exterior package and has a bearing 21 through which the shaft body 11 of the rotating body 10 is inserted. The bearing 21 includes a cylindrical portion that is rotationally and slidably fitted with the shaft body 11 extending in the Z-direction. The housing 20 receives the measuring unit 30 therein.

The measuring unit 30 measures the relative position of the rotating body 10 to the housing 20. The measuring unit 30 may include a fixed measuring unit 31 mounted on the housing 20 and a movable measuring unit 32 mounted on the rotating body 10. The fixed measuring unit 31 includes a substrate 311 and a resistor pattern 312 formed on the substrate 311. The substrate 311 has a hole 311*h*. By fitting the hole 311*h* in the bearing 21, the substrate 311 is received in the housing 20.

Multiple terminals 313 are attached to the housing 20. Each of the multiple terminals 313 are connected to the substrate 311 of the fixed measuring unit 31 with a connecting member 314. The connecting member 314 also serves to electrically connect the pattern 312 formed on the substrate 311 with the terminal 313.

The movable measuring unit 32 includes a sliding element 322 formed of a ring-shaped conductive member. The movable measuring unit 32 is mounted on the housing 20 side, around the shaft body 11 of the rotating body 10. The movable measuring unit 32 is disposed between the rotating body 10 and the fixed measuring unit 31 and rotates along with the rotational motion of the rotating body 10. The rotation of the movable measuring unit 32 causes the sliding element 322 to come into sliding-contact with the pattern 312 on the fixed measuring unit 31. As the movable measuring unit 32 rotates, the contact position between the pattern 312 and the sliding element 322 changes, altering the path of the resistor of the pattern 312 that is electrically connected to the multiple terminals 313. As a result, the resistance between the multiple terminals 313 changes, allowing the relative position between the rotating body 10 and the housing 20 to be measured.

In the measuring unit 30 described above, the pattern 312 provided on the substrate 311 of the fixed measuring unit 31 is formed of a resistor, and the sliding element 322 that comes into sliding-contact with the resistor is provided at the movable measuring unit 32. Alternatively, the resistor pattern may be provided on the movable measuring unit 32, and the sliding element that comes into sliding-contact with the resistor pattern may be provided on the fixed measuring unit 31.

The rotary position sensor 1 according to this embodiment includes engaging portions 15 on the periphery of the flange 12. When the rotating body 10 is rotated using an external force in functional inspection of the measuring unit 30 of the rotary position sensor 1, generally, the operating shaft S is inserted into the shaft hole 10*h*, and the operating shaft S is used to apply a rotational force. However, this method may affect the shaft hole 10*h*.

The presence of the engaging portions 15, as in this embodiment, allows the rotating body 10 to rotate by applying an external force to the engaging portions 15, enabling functional inspection without touching the shaft hole 10*h*. Since the engaging portions 15 are positioned on the periphery of the rotating body 10, operating the engaging portions 15 located radially outside the rotating body 10 may offer higher operational accuracy than operating at the shaft hole 10*h* located at the rotation center of the rotating body 10.

<Engaging Portion>

Figure 3:
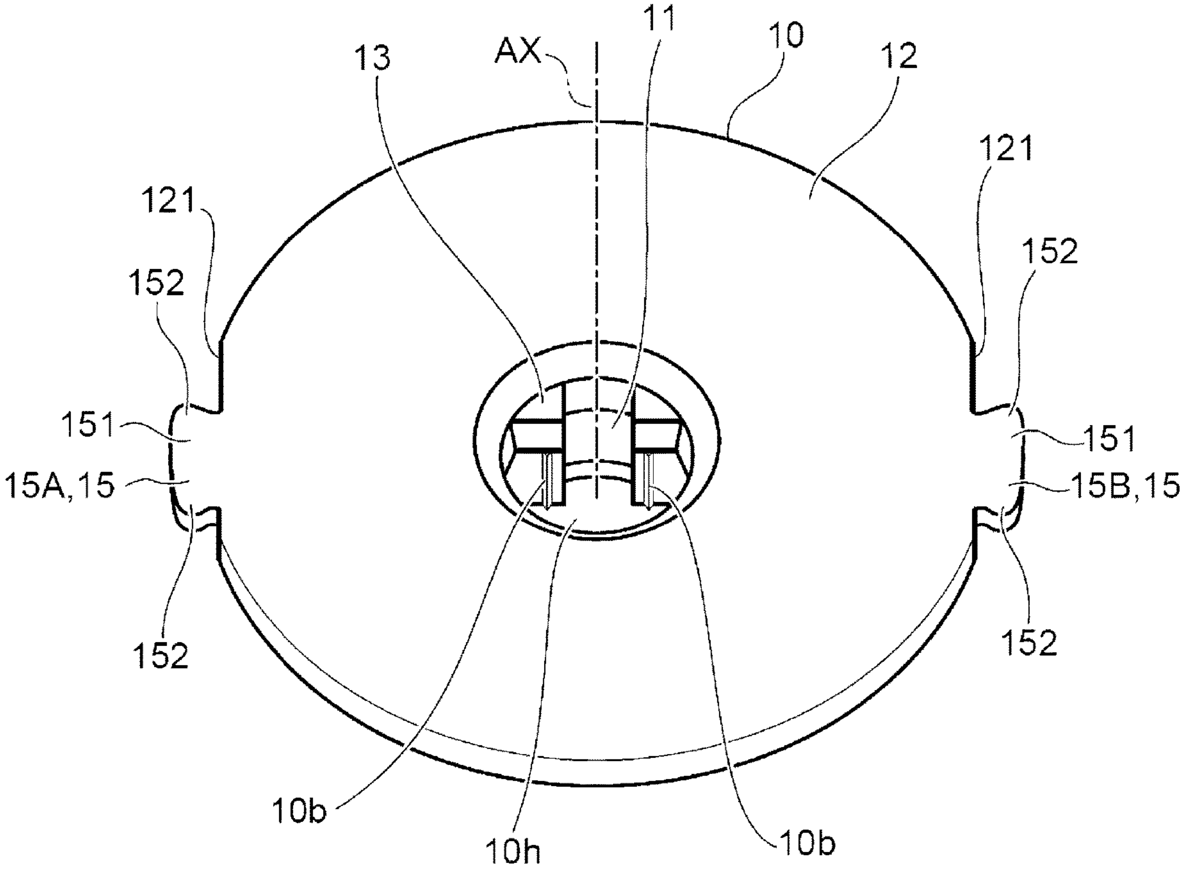
FIG. 3 is a perspective view of a rotating body.
Figure 4:
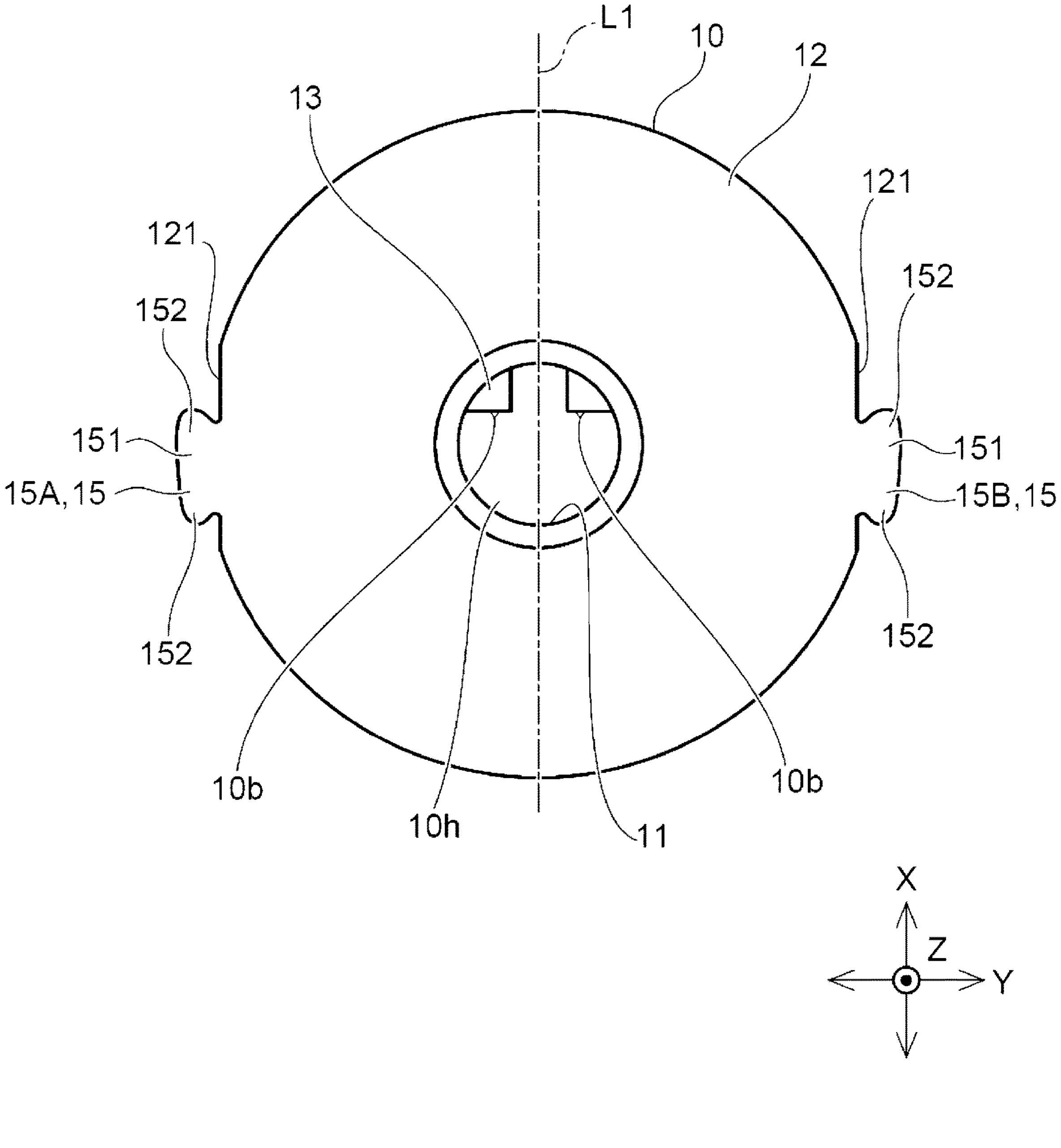
FIG. 4 is a plan view of the rotating body.
Figure 5:
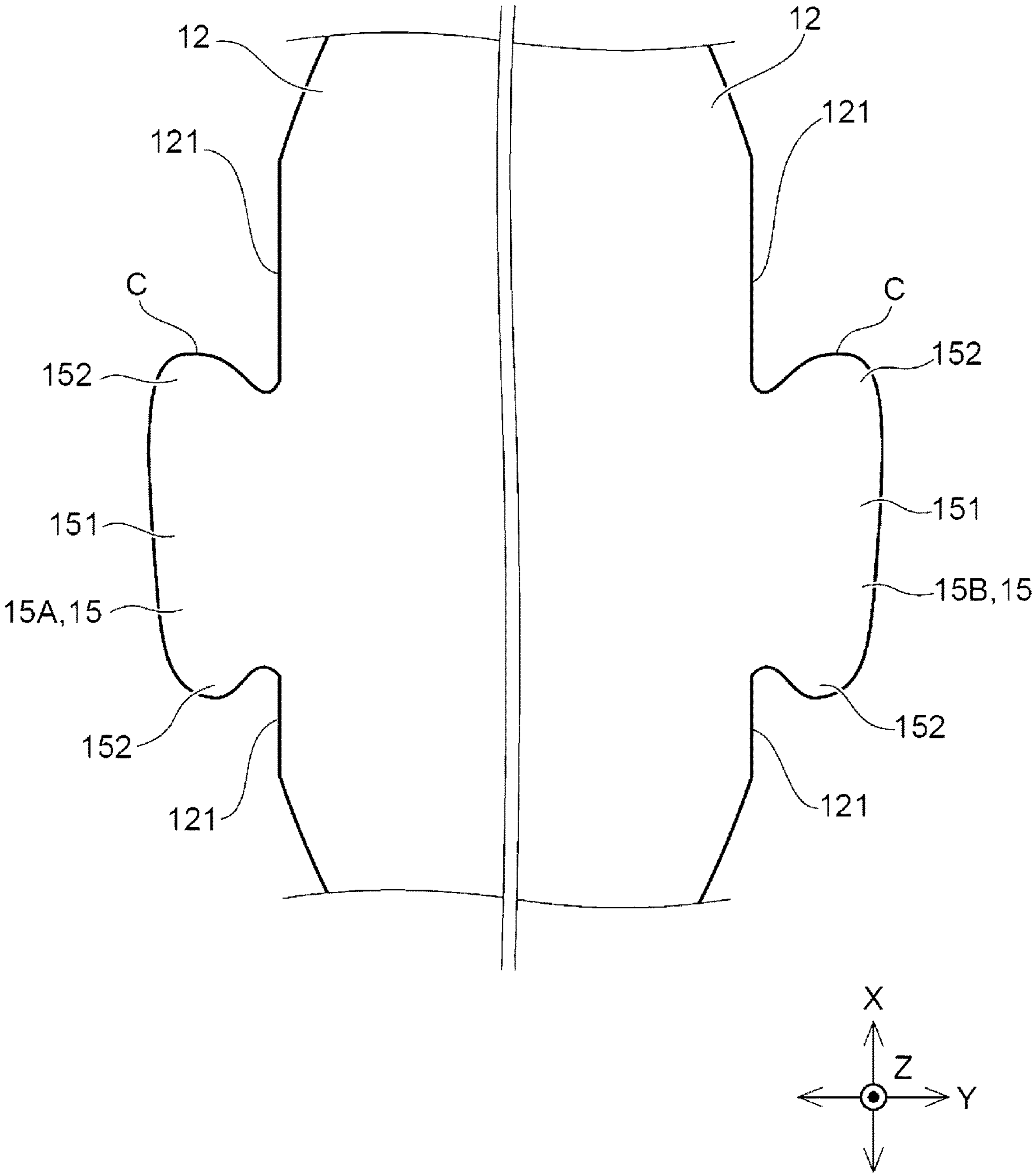
FIG. 5 is a fragmentary enlarged plan view of engaging portions.

FIG. 3 is a perspective view of the rotating body 10. FIG. 4 is a plan view of the rotating body 10. FIG. 5 is a fragmentary enlarged plan view of the engaging portions 15. The engaging portions 15 provided on the periphery of the flange 12 of the rotating body 10 may each include an extending portion 151 extending outward in the radial direction (for example, the Y-direction) of the rotating body 10, as viewed in the Z-direction. In this embodiment, the engaging portions 15 include a first engaging portion 15A and a second engaging portion 15B arranged with the axis of rotation AX of the shaft body 11 therebetween. In other words, the first engaging portion 15A and the second engaging portion 15B are located on the opposite sides of the center of the rotating body 10 in the Y-direction. Each of the first engaging portion 15A and the second engaging portion 15B includes the extending portion 151 extending outward in the Y-direction. In the configuration with the extending portion 151, the internal space of the rotating body 10 is larger than a configuration in which the engaging portions 15 are recessed inside the rotating body 10, providing greater flexibility in the arrangement of the measuring unit 30.

The first engaging portion 15A and the second engaging portion 15B may be located in line-symmetry with respect to a first imaginary line L1 (see FIG. 4) extending along the X-direction of the rotating body 10, as viewed in the Z-direction (the direction along the axis of rotation AX. The line-symmetrical shape of the first engaging portion 15A and the second engaging portion 15B allows a member that applies force to the rotating body 10 to be brought into symmetric-contact with the rotating body 10, thereby rotating the rotating body 10.

The extending portions 151 may each include protruding portions 152 protruding in the X-direction as seen in the Z-direction (the direction along the axis of rotation AX). In other words, the extending portions 151 extending from the periphery of the flange 12 outward in the Y-direction in a convex shape may each include protruding portions 152 protruding in the X-direction from an intermediate point of the extending portion in the Y-direction. For this reason, the extension of the extending portions 151 in the X-direction increases gradually from the base outward in the Y-direction. The protruding portions 152 are easier for a member to come into contact therewith than the other portions, making it easy to engage the member that applies an external force to the rotating body 10 with the engaging portions 15.

Here, each protruding portion 152 is preferably formed as a curve C, as viewed in the Z-direction. The configuration in which the protruding portions 152 are formed with the curve C, the member that applies force to the rotating body 10 and the engaging portions 15 come into point-contact with each other, enhancing the contact stability.

A recessed portion 121 of the flange 12, partially recessed as viewed in the Z-direction, may be continuously connected to each extending portion 151. The recessed portion 121 is recessed inside the position corresponding to the outer circumference of the flange 12 (for example, a linear portion).

<Functional Inspection of Measuring Unit>

Figure 6:
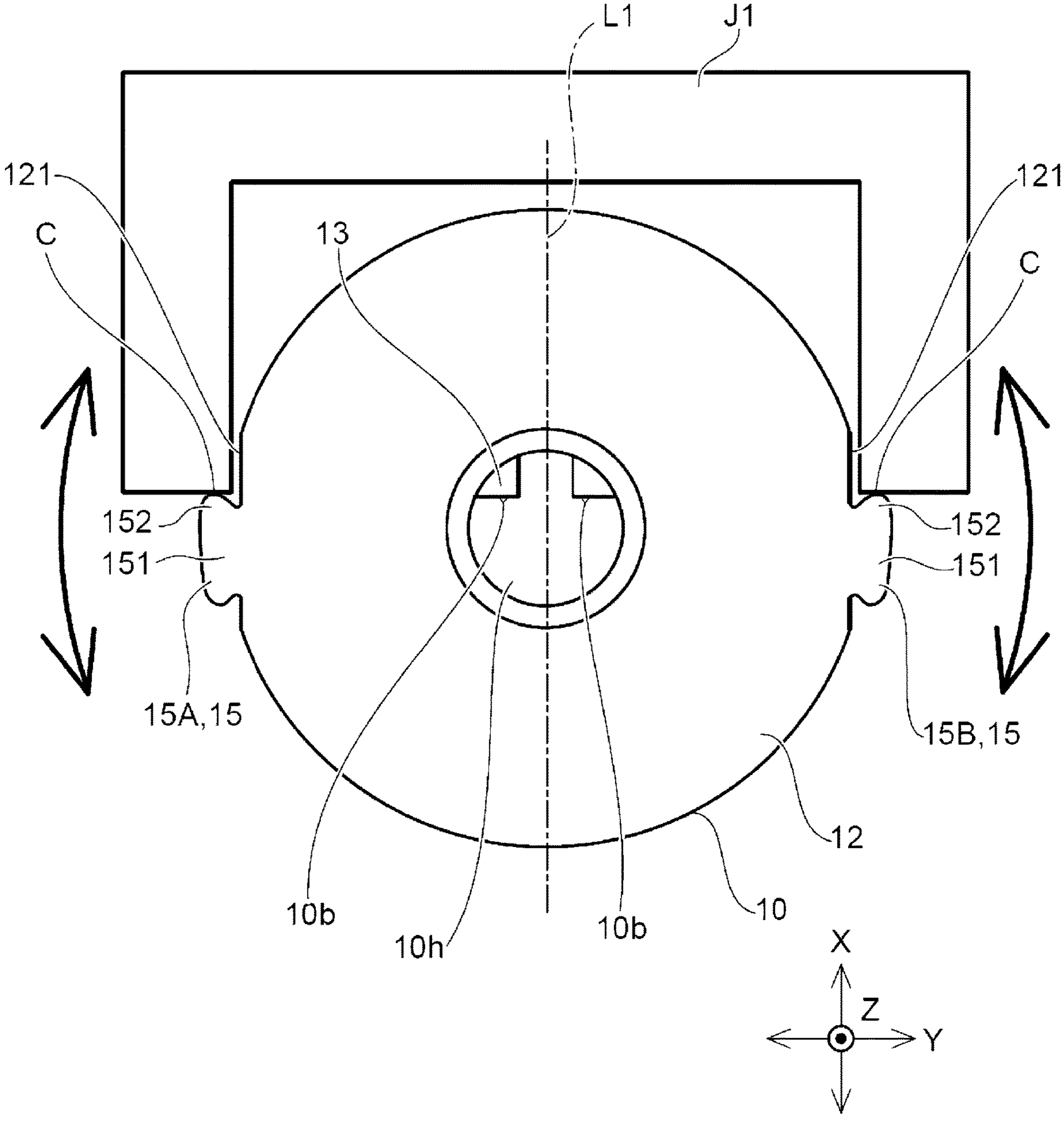
FIG. 6 is a schematic diagram illustrating the functional inspection of a measuring unit.

FIG. 6 is a schematic diagram illustrating the functional inspection of the measuring unit 30. The rotary position sensor 1 measures the relative position of the rotating body 10 to the housing 20 (for example, the rotation angle, rotation amount, and rotation detection) using the measuring unit 30. For this reason, it is necessary to determine whether a correct measured value is output from the measuring unit 30 according to the rotational motion of the rotating body 10 using a functional inspection apparatus.

In the functional inspection of the measuring unit 30 using the functional inspection apparatus, after the rotating body 10 is rotated at a preset angle, the measuring unit 30 determines whether the measured value output from the measuring unit 30 falls within a specified range. For an endurance test using the functional inspection apparatus, the rotating body 10 is repeatedly rotated back and force at a predetermined angle for a predetermined time, and it is determined whether the measured values during the time fall within the specific range. In any inspections, the rotating body 10 is rotated from the outside.

In the case where the rotating body 10 has the shaft hole 10*h* as in conventional devices, the rotating body 10 may be rotated with the operating shaft S for inspection inserted into the shaft hole 10*h*. However, this may cause damage such as scratching or breaking of the shaft hole 10*h*. Since the shaft hole 10*h* is the part where the operating shaft S is inserted when the rotary position sensor 1 is installed in the product, the scratching or breaking of the shaft hole 10*h* caused during the inspection may exert an adverse effect on the operation accuracy in actual use.

Furthermore, if crush ribs 10*b* are provided on the inner surface of the shaft hole 10*h*, the operating shaft S for inspection must be inserted into the shaft hole 10*h* while avoiding the crush ribs 10*b* (for example, shallowly to prevent the operating shaft S from reaching the crush ribs 10*b*) to prevent the crush ribs 10*b* from being crushed during the inspection. For this reason, the operating shaft S (see FIG. 1) cannot be inserted into a deep position in the shaft hole 10*h*, making it prone to wobbling. Since the shaft hole 10*h* is located at the rotation center of the rotating body 10, the shaft hole 10*h* is significantly affected by any wobbling between the operating shaft S and the shaft hole 10*h*, making fine adjustment difficult and preventing an increase in the inspection accuracy.

In the rotary position sensor 1 according to this embodiment, the rotating body 10 has the engaging portions 15, allowing an external force to be applied using the engaging portions 15 located on the periphery of the rotating body 10. Since the engaging portions 15 are located on the periphery of the rotating body 10, even if wobbling occurs between this portion and the member that applies force to the rotating body 10, the effect on the rotational motion is smaller than that of wobbling at the rotation center (wobbling between the operating shaft S and the shaft hole 10*h*). Furthermore, since measurement can be performed without touching the shaft hole 10*h*, it is possible to prevent any impact on the shaft hole 10*h* during inspection.

In the example illustrated in FIG. 6, an operating jig J1 that engages with the first engaging portion 15A and the second engaging portion 15B from the outside of the rotating body 10 is used. When the operating jig J1 is brought into contact with the rotating body 10 from the outside of the rotating body 10, the operating jig J1 comes into contact with the curves C of the respective protruding portions 152 of the first engaging portion 15A and the second engaging portion 15B. The presence of the recessed portions 121 of the flange 12 may prevent the interference between the operating jig J1 and the engaging portions 15 during contact, making it easier to establish contact. The presence of the extending portion 151 continuously connected to each recessed portion 121 ensures stable contact between the operating jig J1 and the engaging portion 15 even if the degree of extension of the extending portion 151 is low. This provides the additional advantage of reducing the overall size of the rotary position sensor 1.

The operating jig J1 is rotated at a predetermined angle, with the operating jig J1 engaged with the first engaging portion 15A and the second engaging portion 15B. The measured value of the measuring unit 30 at that time is obtained, and it is determined whether the measured value is at a specified value.

Since the first engaging portion 15A and the second engaging portion 15B are line-symmetric about the first imaginary line L1, the operating jig J1 can be brought into highly symmetric-contact with the rotating body 10 during rotation. In other words, when the rotating operation involves left and right rotations, the line-symmetric configuration of the first engaging portion 15A and the second engaging portion 15B about the first imaginary line L1 allows a stable force to be applied from the operating jig J1 to the engaging portions 15, regardless of whether the direction of rotation is to the right or to the left, improving the operability (rotational angle controllability) of the operating jig J1.

Figure 7:
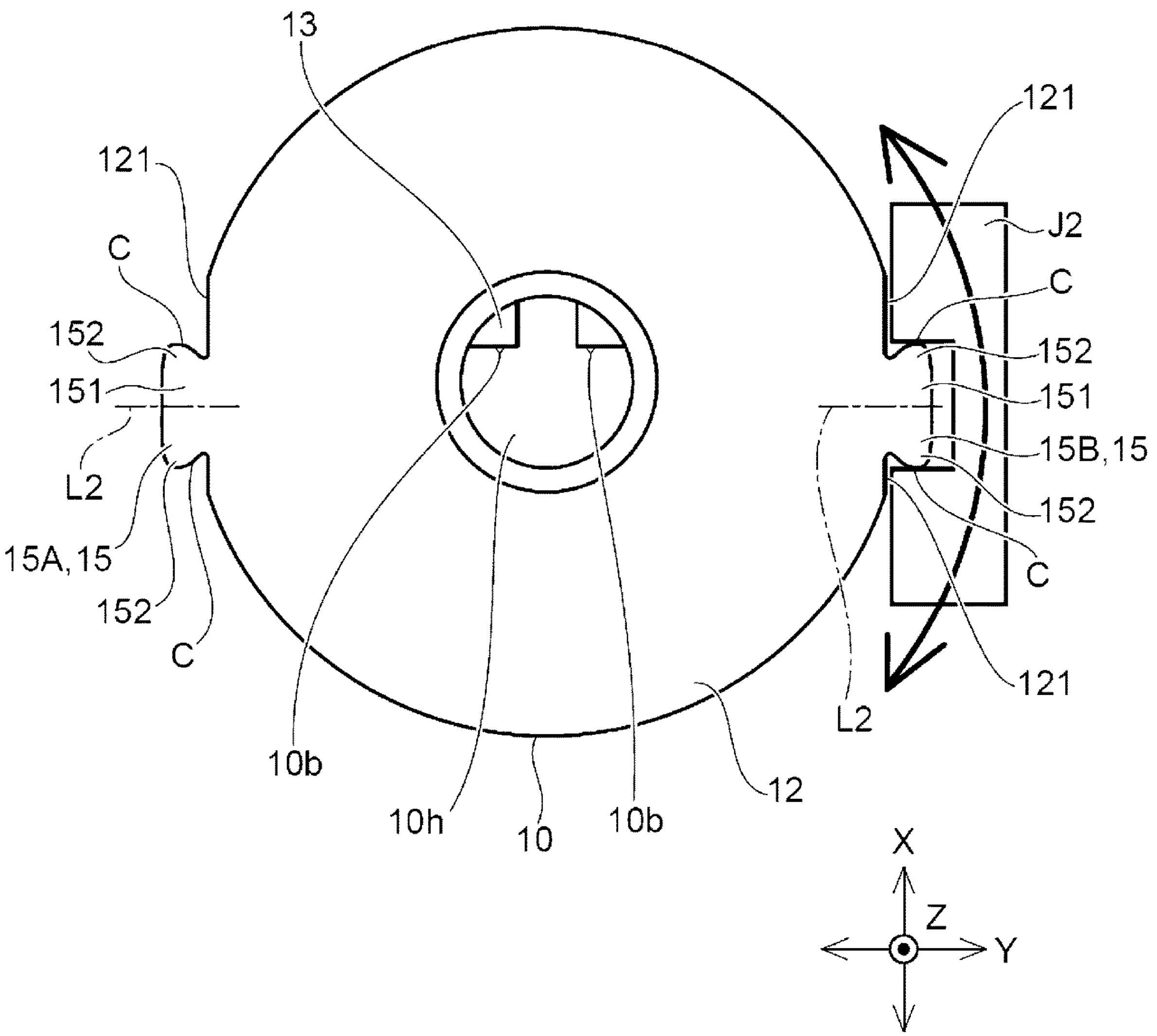
FIG. 7 is a schematic diagram illustrating another example of the functional inspection of the measuring unit.

FIG. 7 is a schematic diagram illustrating another example of the functional inspection of the measuring unit. FIG. 7 illustrates an example of inspection using an operating jig J2 that engages with one of the engaging portions 15. The operating jig J2 is configured to engage with one of the engaging portions 15, for example, the second engaging portion 15B. The operating jig J2 has a recessed portion that engages with the second engaging portion 15B.

Here, the engaging portions 15 preferably have a line-symmetric shape about a second imaginary line L2 extending along the radial direction and passing through the engaging portions 15, as viewed in the Z-direction. With this configuration, when the operating jig J2 engages with one engaging portion 15 to operate the rotating body 10, a stable force can be applied from the operating jig J2 to the engaging portion 15, improving the operability (rotational angle controllability) of the operating jig J2.

<Alignment between Rotating Body and Housing>

Figure 8:
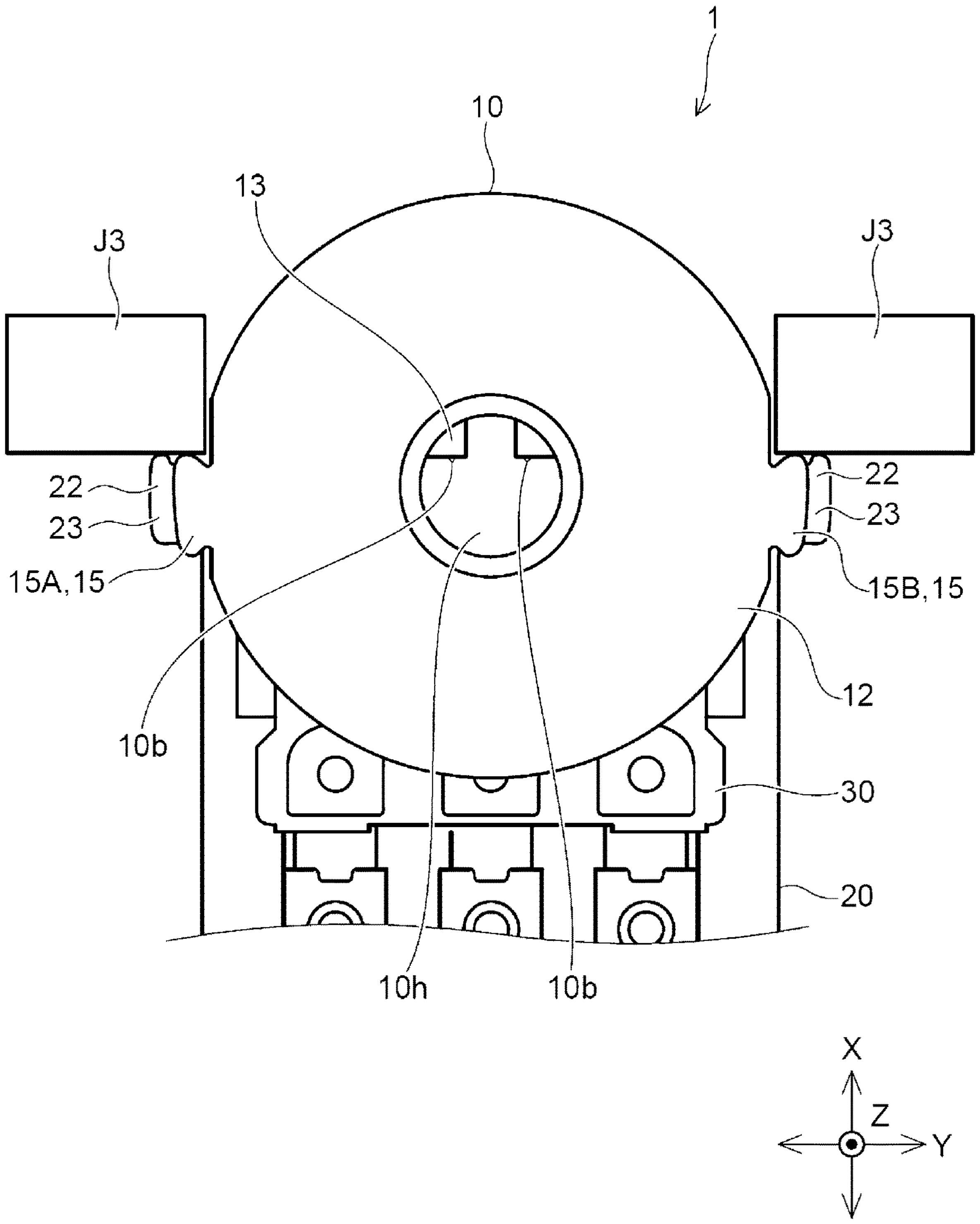
FIG. 8 is a schematic diagram illustrating an example of alignment between a rotating body and the housing.
Figure 9:
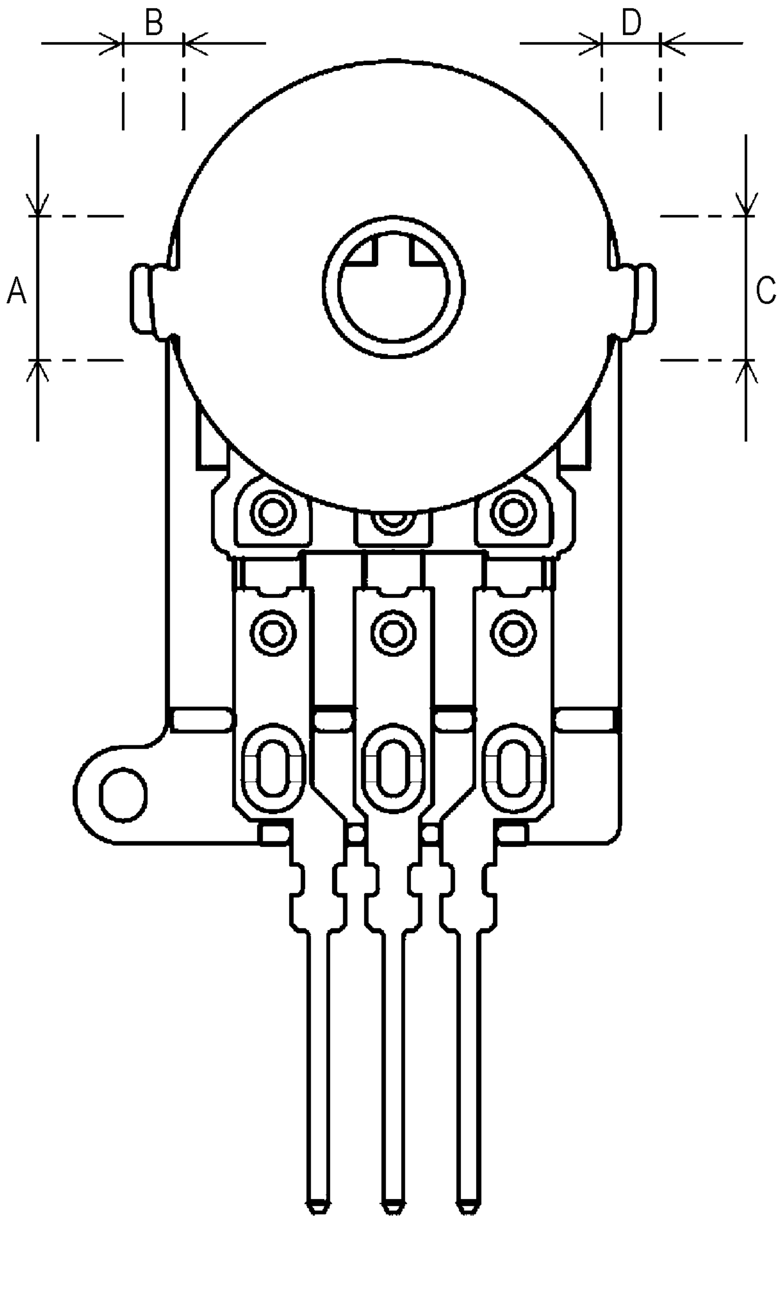
FIG. 9 is a front view of the rotary position sensor according to the embodiment illustrating the overall design thereof.
Figure 10:
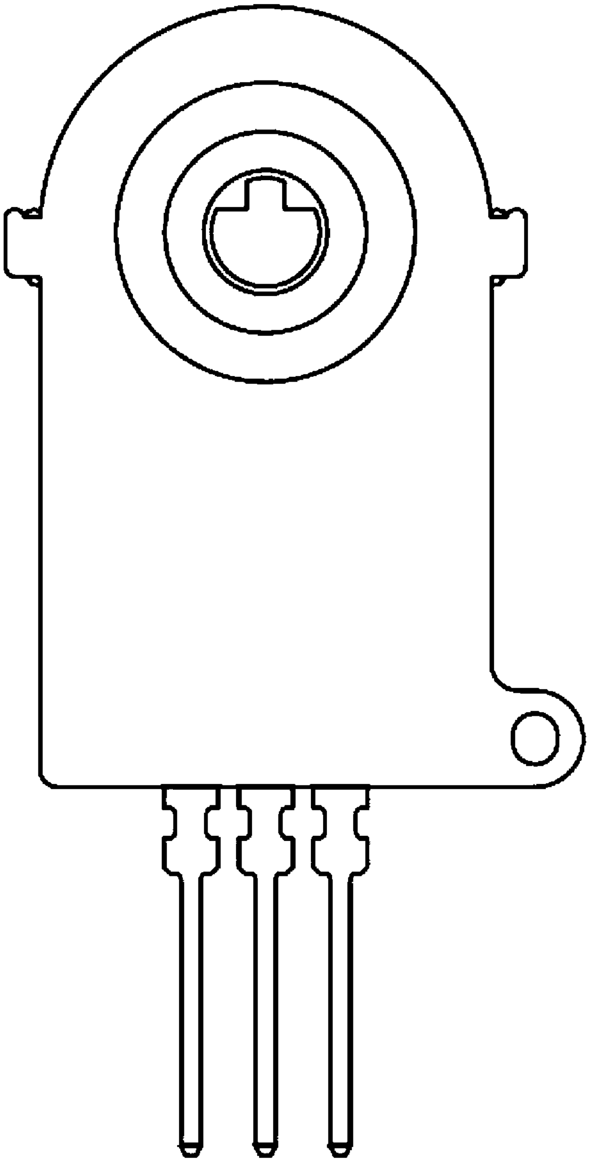
FIG. 10 is a back view of the rotary position sensor according to the embodiment illustrating the overall design thereof.
Figure 11:
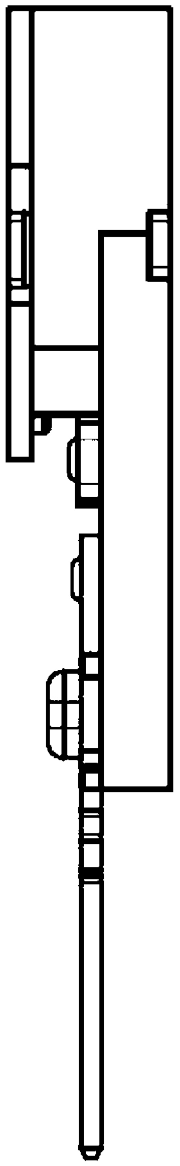
FIG. 11 is a right side view of the rotary position sensor according to the embodiment illustrating the overall design thereof.
Figure 12:
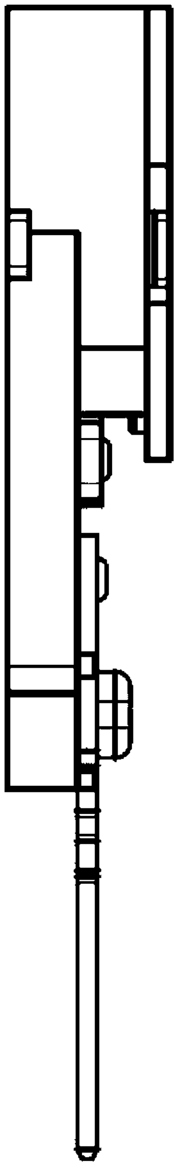
FIG. 12 is a left side view of the rotary position sensor according to the embodiment illustrating the overall design thereof.
Figure 13:
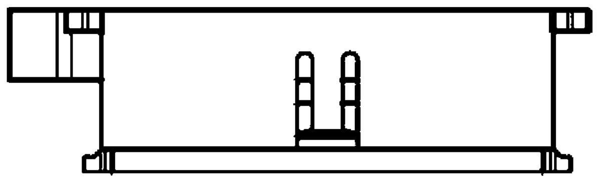
FIG. 13 is a plan view of the rotary position sensor according to the embodiment illustrating the overall design thereof.
Figure 14:
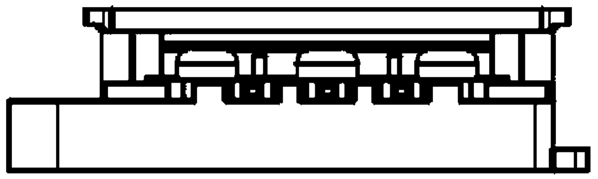
FIG. 14 is a bottom view of the rotary position sensor according to the embodiment illustrating the overall design thereof.
Figure 15:
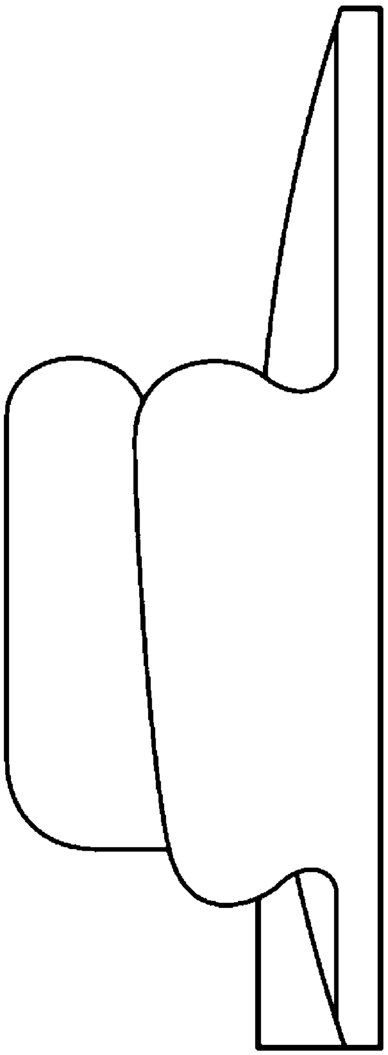
FIG. 15 is a fragmentary enlarged view of part A-B in FIG. 9.
Figure 16:
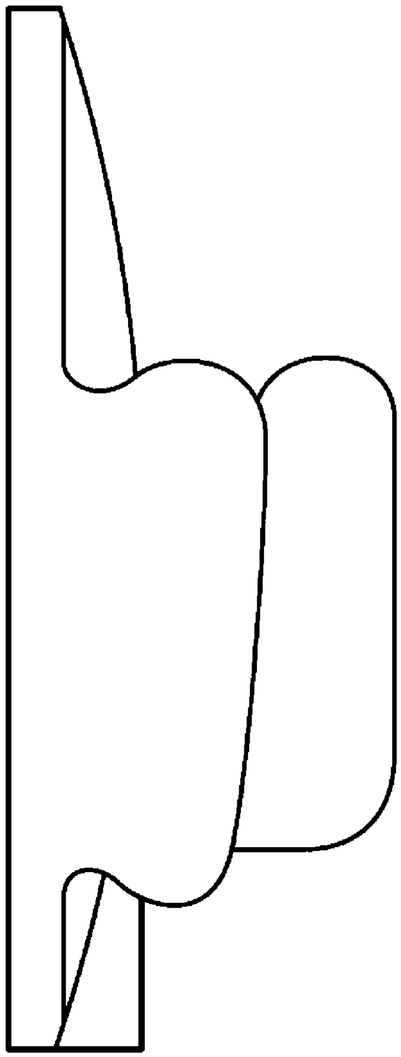
FIG. 16 is a fragmentary enlarged view of part C-D in FIG. 9.
Figure 17:
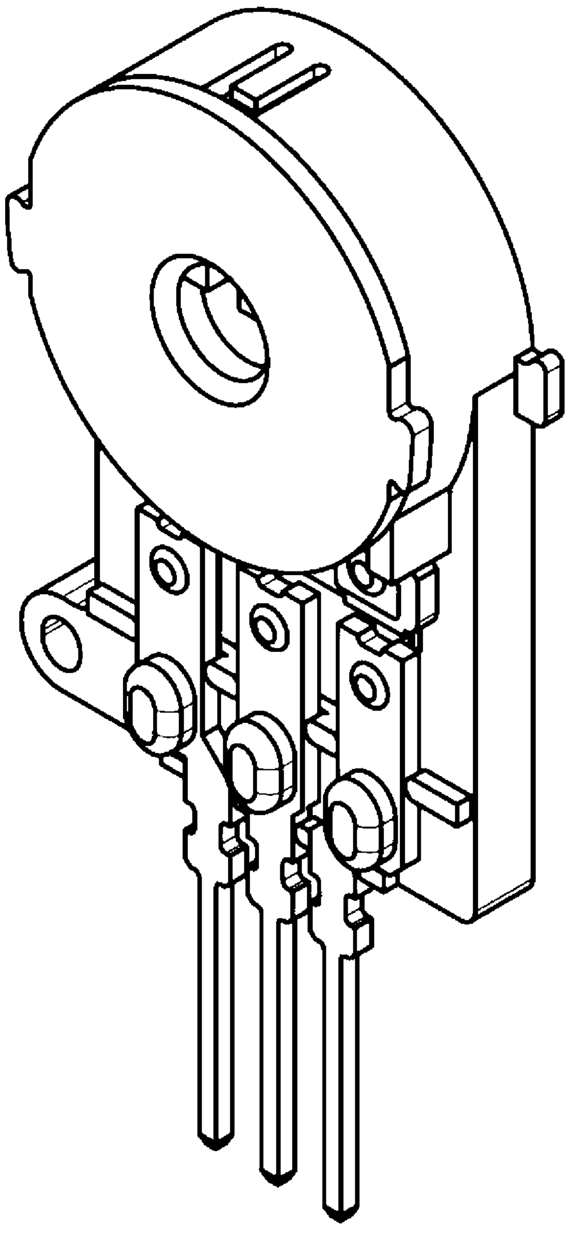
FIG. 17 is a perspective view of the rotary position sensor according to the embodiment illustrating the overall design thereof.
Figure 18:
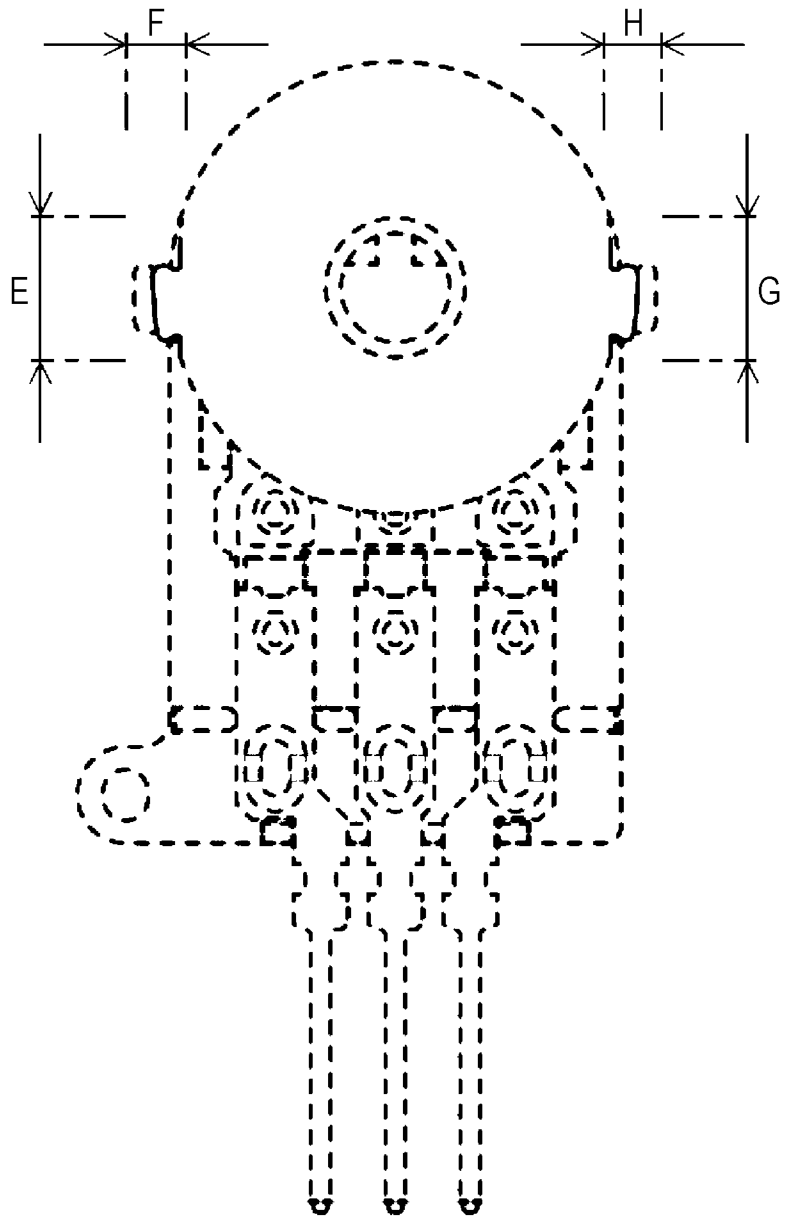
FIG. 18 is a front view of the rotary position sensor according to the embodiment illustrating a partial design thereof (No. 1)
Figure 19:
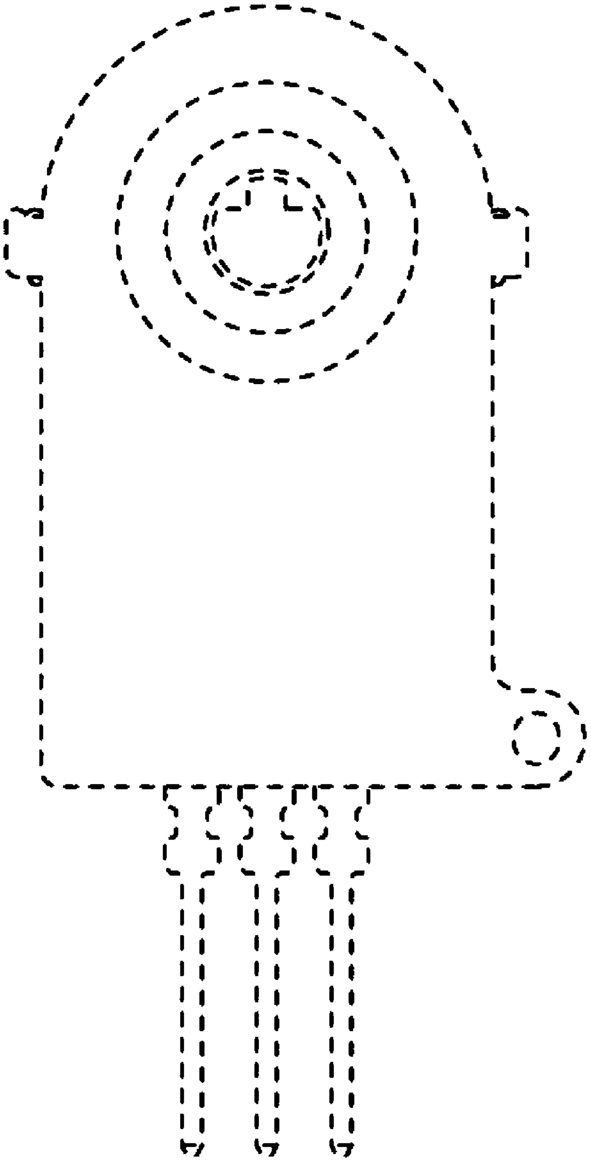
FIG. 19 is a back view of the rotary position sensor according to the embodiment illustrating a partial design thereof (No. 1)
Figure 20:
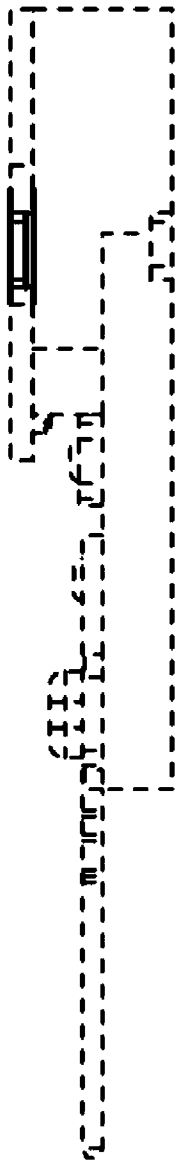
FIG. 20 is a right side view of the rotary position sensor according to the embodiment illustrating a partial design thereof (No. 1)
Figure 21:
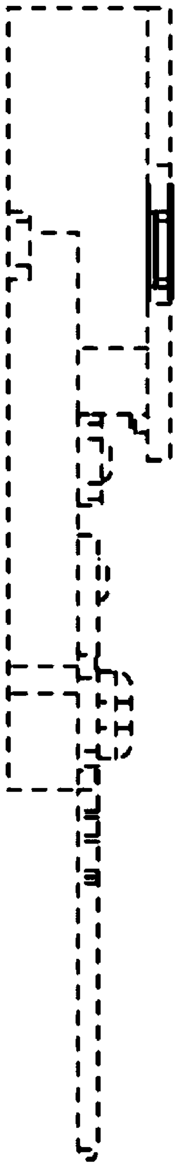
FIG. 21 is a left side view of the rotary position sensor according to the embodiment illustrating a partial design thereof (No. 1)
Figure 22:
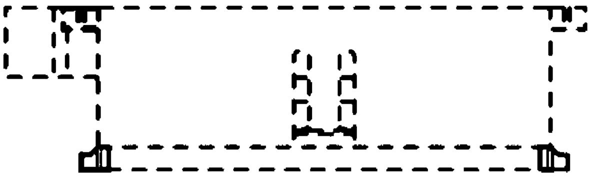
FIG. 22 is a plan view of the rotary position sensor according to the embodiment illustrating a partial design thereof (No. 1)
Figure 23:
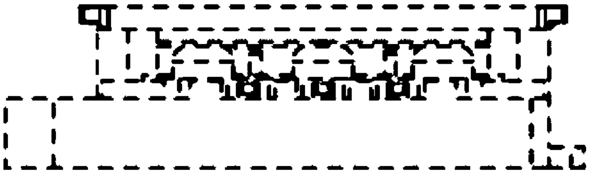
FIG. 23 is a bottom view of the rotary position sensor according to the embodiment illustrating a partial design thereof (No. 1)
Figure 24:
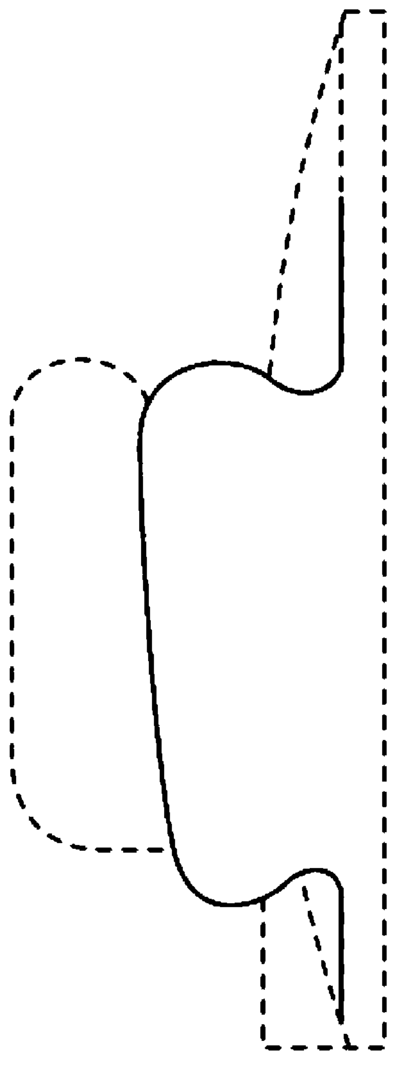
FIG. 24 is a fragmentary enlarged view of part E-F in FIG. 18.
Figure 25:
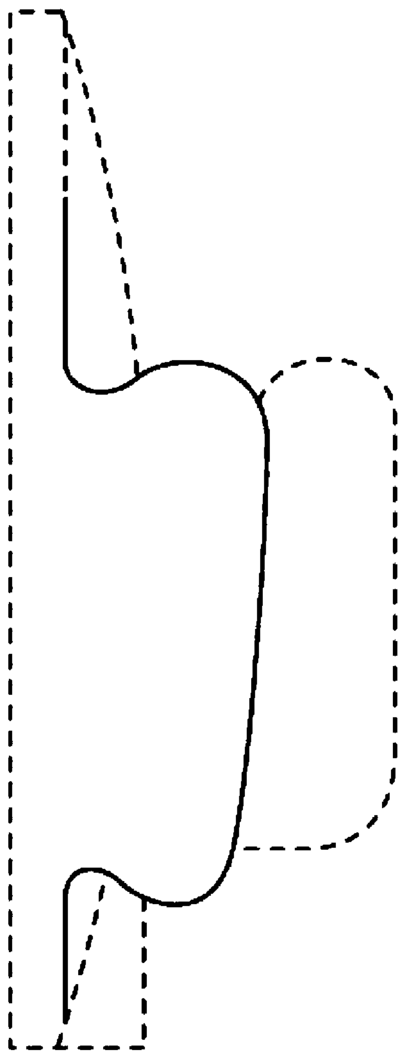
FIG. 25 is a fragmentary enlarged view of part G-H in FIG. 18.
Figure 26:
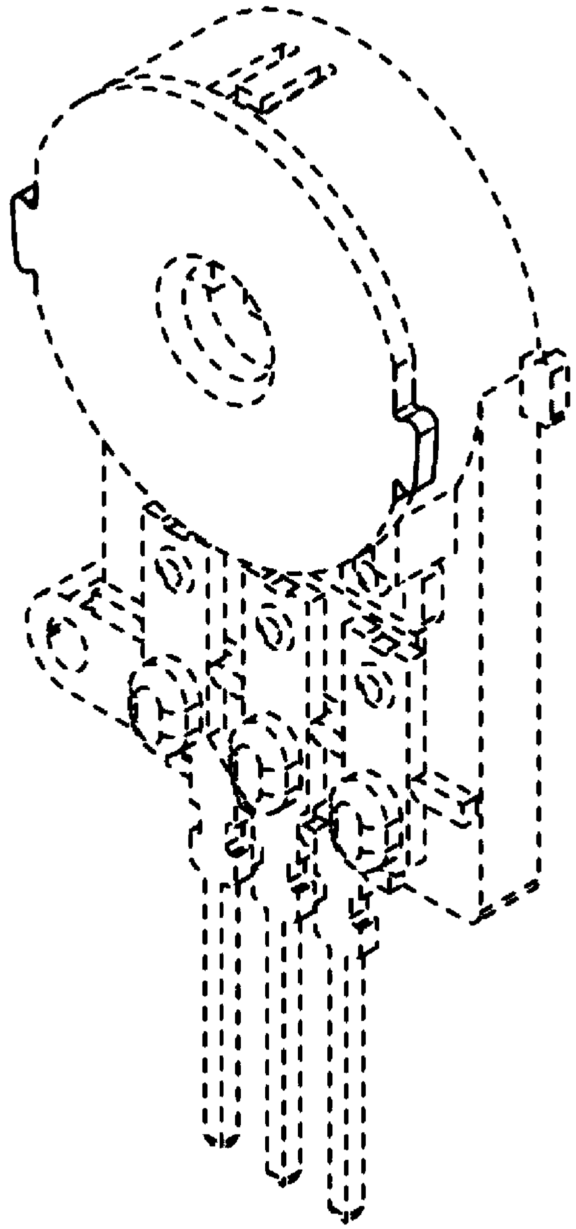
FIG. 26 is a perspective view of the rotary position sensor according to the embodiment illustrating a partial design thereof (No. 1)
Figure 27:
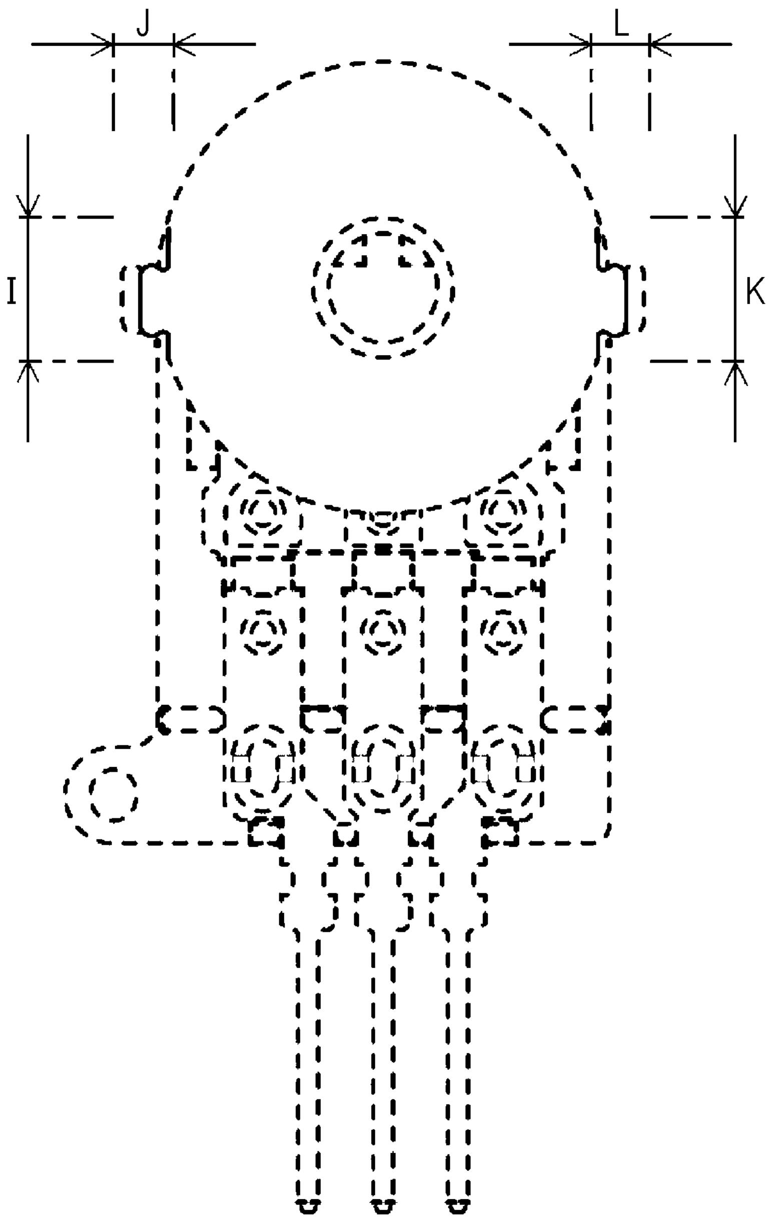
FIG. 27 is a front view of the rotary position sensor according to the embodiment illustrating a partial design thereof (No. 2)
Figure 28:
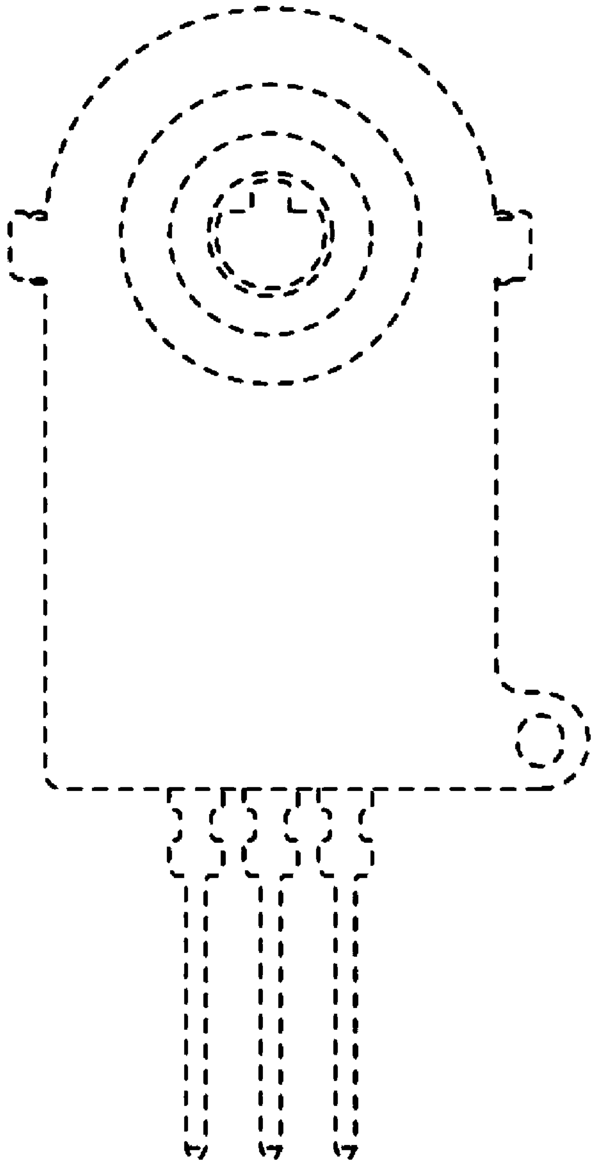
FIG. 28 is a back view of the rotary position sensor according to the embodiment illustrating a partial design thereof (No. 2)
Figure 29:
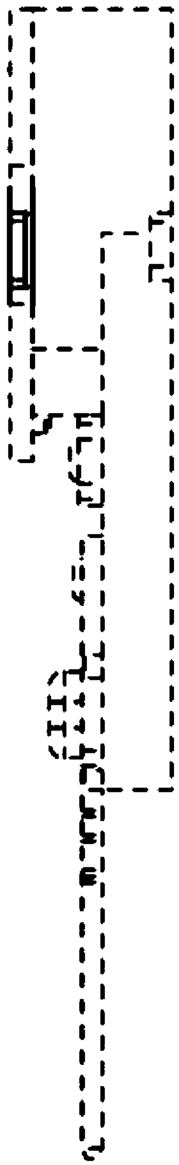
FIG. 29 is a right side view of the rotary position sensor according to the embodiment illustrating a partial design thereof (No. 2)
Figure 30:
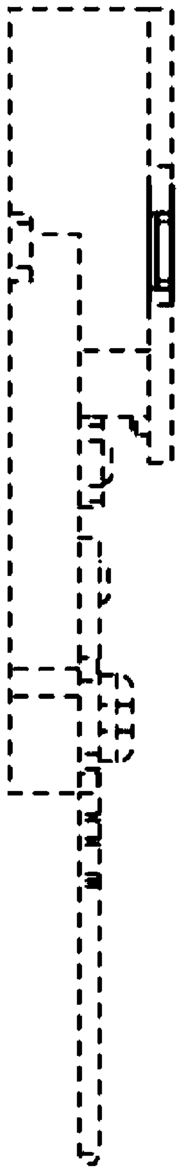
FIG. 30 is a left side view of the rotary position sensor according to the embodiment illustrating a partial design thereof (No. 2)
Figure 31:
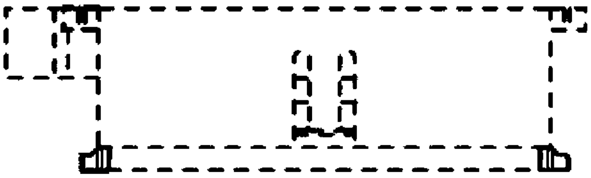
FIG. 31 is a plan view of the rotary position sensor according to the embodiment illustrating a partial design thereof (No. 2)
Figure 32:
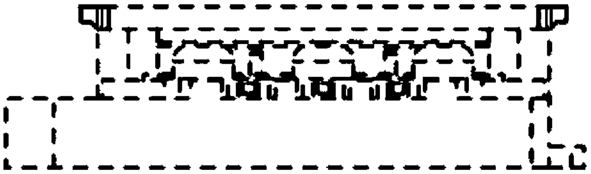
FIG. 32 is a bottom view of the rotary position sensor according to the embodiment illustrating a partial design thereof (No. 2)
Figure 33:
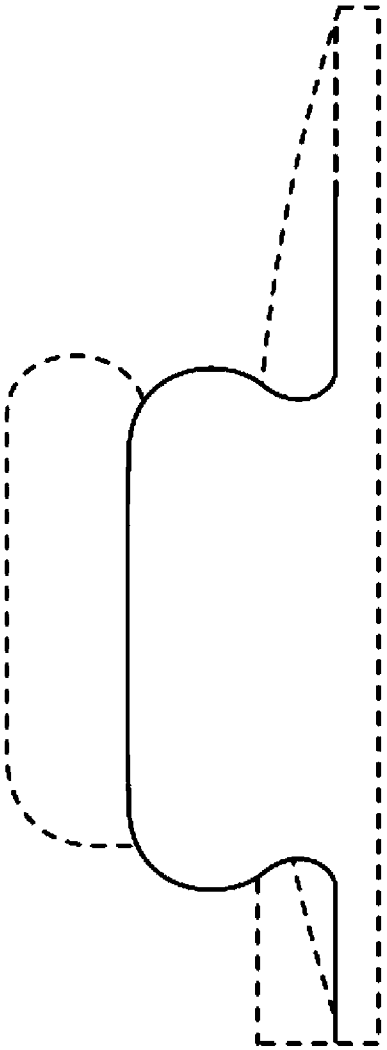
FIG. 33 is a fragmentary enlarged view of part I-J in FIG. 27.
Figure 34:
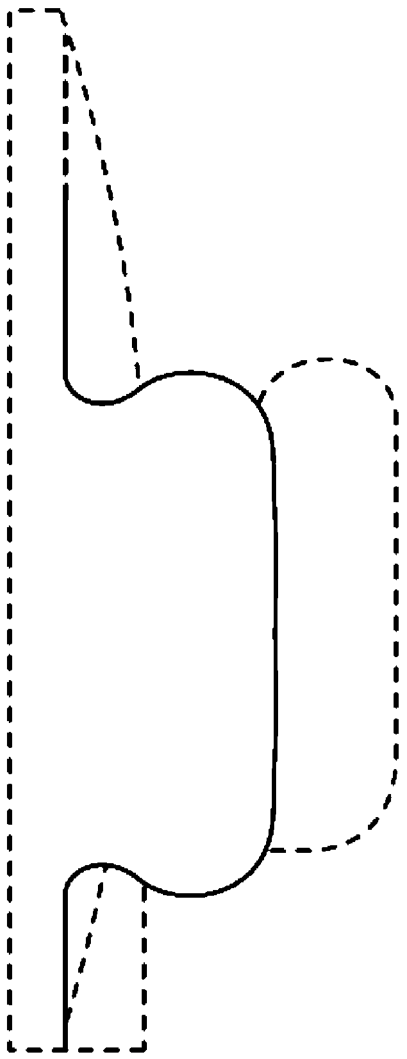
FIG. 34 is a fragmentary enlarged view of part K-L in FIG. 27.
Figure 35:
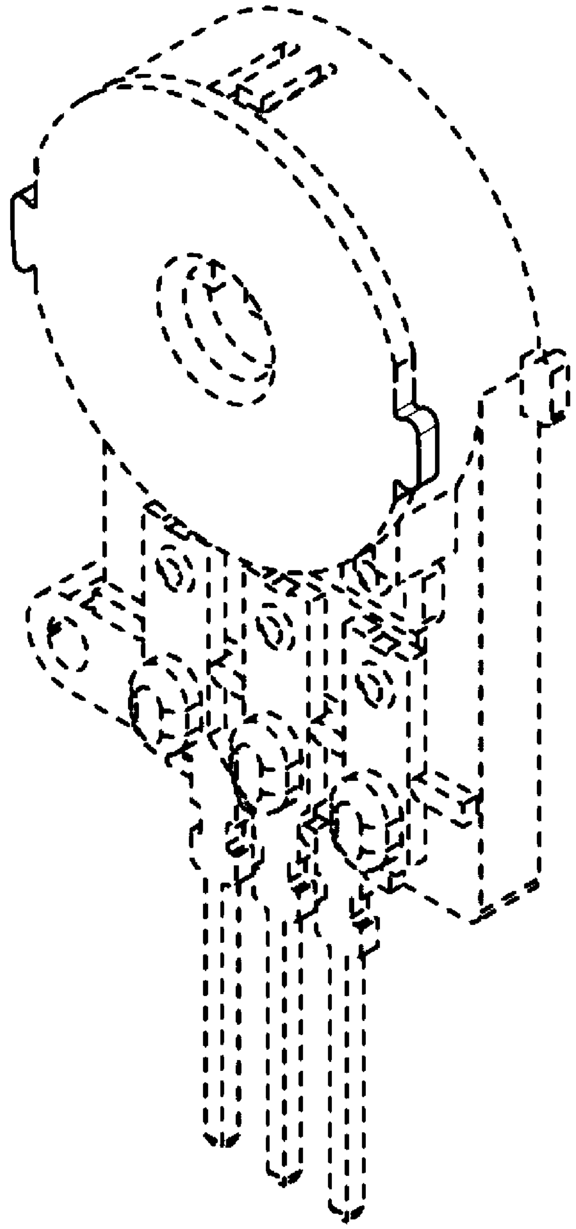
FIG. 35 is a perspective view of the rotary position sensor according to the embodiment illustrating a partial design thereof (No. 2).

FIG. 8 is a schematic diagram illustrating an example of alignment between the rotating body and the housing. As illustrated in FIG. 8, the housing 20 may have protrusions 22 each including an overlapping portion that overlaps with the engaging portion 15 of the rotating body 10 located at a predetermined reference position, as viewed in the Z-direction. A functional inspection of the measuring unit 30 is performed, with the rotating body 10 positioned at a predetermined reference position relative to the housing 20.

For alignment between the rotating body 10 and the housing 20, an alignment jig J3 is disposed so as to come into contact with the overlapping portion of the protrusion 22 and the engaging portion 15. In other words, the alignment jig J3 is brought into contact with both the protrusion 22 and the engaging portion 15 to align the protrusion 22 and the engaging portion 15 in the X-direction, as viewed in the Z-direction. This allows the rotating body 10 to be positioned at the reference position. The alignment jig J3 may be used also as the operating jig J1. In this case, for inspection after the alignment, only the rotating body 10 is rotated, with the alignment jig J3 shifted in the Z-direction so as not to come into contact with the protrusion 22.

The protrusion 22 may include a non-overlapping portion 23 positioned outside the engaging portion 15, as viewed in the Z-direction. If the protrusion 22 includes the non-overlapping portion 23 positioned outside the engaging portion 15, it can easily be visually (by visual or image recognition) determined whether the rotating body 10 is at the reference position in the Z-direction during alignment.

<Appearance (Design) of Rotary Position Sensor>

FIGS. 9 to 17 are diagrams illustrating the overall design of the rotary position sensor 1. FIGS. 18 to 26 are diagrams illustrating a partial design (No. 1) of the rotary position sensor 1. FIGS. 27 to 35 are diagrams illustrating a partial design (No. 2) of the rotary position sensor 1.

"Description of Design" of the overall design of the rotary position sensor 1 illustrated in FIGS. 9 to 17 is as follows. In FIGS. 9 to 17, the thin lines are all used to define the shape of the three-dimensional surface.

"Description of design" of the partial design (No. 1) of the rotary position sensor 1 illustrated in FIGS. 18 to 26 is as follows. In FIGS. 18 to 26, the portions indicated by the solid lines (the engaging portions 15 and part of the recessed portions 121) indicate the partial design. In FIGS. 18 to 26, the thin lines are all used to define the shape of the three-dimensional surface.

"Description of design" of the partial design (No. 2) of the rotary position sensor 1 illustrated in FIGS. 27 to 35 is as follows. In FIGS. 27 to 35, the portions indicated by the solid lines (the engaging portions 15 and part of the recessed portions 121) indicate the partial design. In FIGS. 27 to 35, the thin lines are all used to define the shape of the three-dimensional surface.

Thus, the rotary position sensor 1 according to the embodiments can transmit the rotational motion from the operating jig J1 or J2 to the rotating body 10 with high accuracy, allowing inspection without affecting the shaft hole 10*h*.

Having described the embodiments, the present invention is not limited to the embodiments. For example, the measuring unit 30 may use a method other than the electrical resistance variation type (for example, a magnetic variation type, optical detection type, or capacitive detection type). The number of engaging portions 15 provided at the rotating body 10 may be one or three or more. It is to be understood that addition, deletion, or design changes of components performed by those skilled in the art on the above embodiments, as well as appropriate combinations of the features of the configurations of the embodiments, are also included within the scope of the present invention as long as they fall within the gist of the present invention.

What is claimed is:

1. A rotary position sensor comprising:

a rotating body having an axis of rotation extending in a first direction, the rotating body including:

a cylindrical shaft body having a shaft hole; and a flange continuously connected to the shaft body and extending from the shaft body outward in a radial direction of the rotating body;

a housing including a bearing through which the cylindrical shaft body of the rotating body is inserted; and a measuring unit configured to measure a relative position of the rotating body to the housing, wherein the flange includes an engaging portion on a periphery thereof, the engaging portion having a projection portion protruding outward from the periphery of the flange in the radial direction viewed from the first direction.

2. The rotary position sensor according to claim 1, wherein the shaft hole has a holder for receiving and holding an operating shaft having a non-circular cross section viewed from the first.

3. The rotary position sensor according to claim 1, wherein the engaging portion includes a first engaging portion and a second engaging portion disposed on opposite sides of the axis of rotation of the rotating body, such that the first engaging portion and the second engaging portion are line-symmetry with respect to an imaginary line extending in the radial direction of the rotating body viewed from the first direction.

4. The rotary position sensor according to claim 1, wherein the projection portion includes a protruding portion protruding in a direction perpendicular to a direction in which the projection portion extends viewed from the first direction.

5. The rotary position sensor according to claim 4, wherein the protruding portion is formed as a curve viewed from the first direction.

6. The rotary position sensor according to claim 1, the flange includes a partially recessed portion continuously connected to the projection portion viewed from the first direction.

7. The rotary position sensor according to claim 1, wherein the engaging portion has a line-symmetric shape with respect to an imaginary line extending along the radial direction of the rotating body and passing through the engaging portion viewed from the first direction.

8. The rotary position sensor according to claim 1, wherein the housing includes a protrusion having an overlapping portion overlapping with the engaging portion when the rotating body is positioned at a reference position viewed from the first direction.

9. The rotary position sensor according to claim 8, wherein the protrusion includes a portion extending outward beyond the engaging portion viewed from the first direction.

10. The rotary position sensor according to claim 1, wherein the measuring unit includes:

a fixed measuring unit mounted on the housing; and a movable measuring unit mounted on the rotating body.

11. The rotary position sensor according to claim 10, wherein the fixed measuring unit includes a resistor, and wherein the movable measuring unit includes a sliding element that comes into sliding-contact with the resistor.

12. The rotary position sensor according to claim 10, wherein the movable measuring unit includes a resistor, and wherein the fixed measuring unit includes a sliding element that comes into sliding-contact with the resistor.

13. The rotary position sensor according to claim 1, further comprising a crush rib provided on an inner wall of the shaft hole.

14. The rotary position sensor according to claim 1, wherein the engaging portion is configured to engage with an operating jig of a functional inspection apparatus for inspecting the measuring unit.

15. The rotary position sensor according to claim 1, wherein the engaging portion is configured to receive an external force, thereby allowing the rotating body to rotate.

* * * * *